United States Patent [19]
Flinois et al.

[11] Patent Number: 5,127,064
[45] Date of Patent: Jun. 30, 1992

[54] HIGH RESOLUTION IMAGE COMPRESSION METHODS AND APPARATUS

[75] Inventors: Xavier A. Flinois, Mountain View; Stefano E. Concina, San Jose, both of Calif.

[73] Assignee: Schlumberger Technologies, Inc., San Jose, Calif.

[21] Appl. No.: 655,255

[22] Filed: Feb. 13, 1991

Related U.S. Application Data

[63] Continuation of Ser. No. 276,360, Nov. 23, 1988, abandoned.

[51] Int. Cl.$^5$ ............................................... G06K 9/00
[52] U.S. Cl. ...................................... 382/56; 382/21; 382/27; 250/310
[58] Field of Search ........................ 382/56, 54, 52, 50, 382/21, 27; 358/280, 260, 261.3, 138, 433; 340/731, 752; 250/310

[56] References Cited

U.S. PATENT DOCUMENTS

| | | | |
|---|---|---|---|
| 4,677,479 | 6/1987 | Hatori et al. | 382/50 |
| 4,706,019 | 11/1987 | Richardson | 250/310 |
| 4,721,909 | 1/1988 | Richardson | 250/396 R |
| 4,764,975 | 8/1988 | Inoue | 382/56 |
| 4,776,030 | 10/1988 | Tzon | 382/56 |
| 4,782,389 | 11/1988 | Mayweather, III | 382/54 |
| 4,831,658 | 5/1989 | Umeda et al. | 382/50 |

OTHER PUBLICATIONS

E. Menzel & E. Kubalek, *Fundamentals of Electron Beam Testing of Integrated Circuits*, 5 Scanning 103-122 (1983).

E. Plies & J. Otto, *Voltage Measurement Inside Integrated Circuit Using Mechanical and Electron Probes*, IV Scanning Electron Microscopy 1491-1500 (1985).

S. Concina, G. Liu, L. Lattanzi, S. Reyfman & N. Richardson, *Software Integration in a Workstation Based E-Beam Tester*, International Test Conference Proceedings (1986).

N. Richardson, *E-Beam probing for VLSI Circuit Debug*, VLSI Systems Design (1987).

(List continued on next page.)

Primary Examiner—Michael Razavi
Assistant Examiner—Yon Jung
Attorney, Agent, or Firm—Kenneth Olsen; Keith G. W. Smith; Bruce D. Riter

[57] ABSTRACT

The present invention provides methods and apparatus for rapid compression of images composed of pixels into high-resolutions, compressed icon images, and for dynamic fault imaging of operating faults in integrated circuit devices employing such methods. Displaying a plurality of such icons juxtaposed on a screen permits ready tracing of a fault in an IC device under test, even by persons having little knowledge of the functionality of the devices.

In accordance with the invention, an image made up of $n \times n$ pixels may be compressed into an icon of $p \times p$ pixels, where $n = P \cdot q$ and q is an integer, by dividing the image into p tiles of $q \times q$ pixels, selecting q pixels from each tile, where each of said selected q pixels is representative of predetermined directional orientations within the tile, and calculating the mean value of the selected q pixels, to produce a single pixel representative of the tile. The pixels representative of said tiles thus form an icon of $p \times p$ pixels. Each of the selected q pixels is preferably uniquely representative of a horizontal row of q pixels, a vertical column of q pixels, and a pair of mutually-orthogonal diagonal lines of pixels of the tile. Edge enhancement may also be performed to sharpen the features of the resulting icon.

The invention further includes a method of dynamic imaging of operating faults in integrated circuit devices. The methods are preferably carried out in the general purpose processor of an engineering workstation, which may be associated with an electron beam test probe for acquisition of the images.

11 Claims, 7 Drawing Sheets q*q pixels on the image    become    1 pixel on the icon T. May, G. Scott, E. Meieran, P. Wiener & V. Rao, *Dynamic Fault Imaging of VLSI Random Logic Devices*, International Physics Symposium Proceedings (1984).

W. Pratt, Digital Image Processing (1978), pp. 322–323.

H. Feuerbaum, *Electron Beam Testing: Methods and Applications*, 5 Scanning 14–24 (1983).

S. Daniel & L. Hampton, *Diagnosing Yield Problems with E-Beam Probers*, Semiconductor International (Aug. 1988).

S. Harari & C. Talbot, *Chip Diagnosis: A New Methodology*, Evaluation Engineering (Oct. 1987).

J. McLeod, *A New Tool Dramatically Cuts VLSI Debugging time*, Electronics (Apr. 30, 1987).

IDS 4000 Integrated Diagnostic System, (published by Schlumberger/ATE, Aug., 1988).

IDS 5000 Integrated Diagnostic System, (published by Schlumberger/ATE, May, 1988).

*Solving the Navigational Problem in VLSI Debug*, 1 Issues in VLSI Diagnostics & Test, No. 2 (published by Schlumberger/ATE, Oct., 1987).

S. Concina & N. Richardson *IDS 5000: an integrated Diagnosis System for VLSI*, 7 Microelectronic Engineering (1987).

HIGH RESOLUTION IMAGE COMPRESSION METHODS AND APPARATUS

This application is a continuation of application Ser. No. 07/276,360, filed Nov. 23, 1988, now abandoned.

BACKGROUND OF THE INVENTION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

1. Field of the Invention

The present invention relates to methods for high-resolution compression of images, and more particularly to methods for dynamic imaging of operating faults in integrated circuits in which compressed, high-resolution icon images are created from larger images representing operating states of integrated circuits under test.

2. Description of Related Art

Decreases in the size of internal features of Very Large Scale Integrated (VLSI) circuit devices demand even faster and more reliable design and testing. Conventional Integrated Circuit (IC) testers can only retrieve information from the external pins of the Device Under Test (DUT), thus limiting subsequent diagnoses. A failure detected with a conventional tester may be caused by a discrepancy at any point inside the component. If the DUT has hundreds of thousands of gates, fault identification becomes a complex and tedious chore.

In a typical test operation, a conventional IC tester (one which applies stimuli to input pins of the IC and measures the results at the IC output pins) detects a fault at some vector (for example, vector v) in a test vector sequence when testing an IC device. The test sequence may contain a large number of test vectors, for example, 100 or more test vectors, each vector representing a set of stimuli, such as input voltages, applied to the pins of the DUT. The origin of the detected fault occurs somewhere in the chip, at some vector (for example, vector a), between the first vector of the sequence (vector 1) and the vector at which the fault was detected (vector v). This fault then propagates forward and appears at an external pin or bond pad of the DUT at vector v. It is then desired to identify the nature, location and time of generation of the fault occurring at vector a.

Internal probing of the chip is therefore necessary. For many years, the preferred solution has been to prove the chip using a low energy (around 1 keV) scanning electron microscope (SEM). See, for example, E. Menzel & E. Kubalek, Fundamentals of Electron Beam Testing of Integrated Circuits, 5 Scanning 103-122 (1983), and E. Plies & J. Otto, Voltage Measurement Inside Integrated Circuit Using Mechanical and Electron Probes, IV SCANNING ELECTRON MICROSCOPY 1491-1500 (1985).

Until recently, the SEM was a sophisticated lab instrument, used only by experienced researchers. In 1987, the "IDS 5000 TM" workstation-based, electron-beam test system was commercially introduced by Schlumberger. S. Concina, G. Liu, L. Lattanzi, S. Reyfman & N. Richardson, Software Integration in a Workstation Based E-Beam Tester, International Test Conference Proceedings (1986); N. Richardson, E-Beam Probing for VLSI Circuit Debug, VLSI Systems Design (1987); S. Concina & N. Richardson IDS 5000: an Integrated Diagnosis System for VLSI, 7 Microelectronic Engineering (1987). See also U.S. Pat. Nos. 4,706,019 and 4,721,909 to N. Richardson.

Measurement and information gathering is thus no longer a major problem in analyzing IC failures. Organizing the extensive and detailed information obtained about an IC with such a tester is, however, critical to rapid and effective fault diagnosis.

Rather than seeking the answer to an absolute problem ("Why does this device fail?"), it may be preferable to address a relative problem ("Where, when and why does this device behave differently from a known good device?"). With the latter approach to diagnosis, operating faults in the IC can be traced.

To perform such a diagnosis, a time period of interest between 0 (the beginning of the test sequence of interest) and the first fault detection is selected. This period is divided into intervals such that, in each interval, the IC has a fixed behavior. Each interval thus corresponds to an operating state of the IC. After the states of interest have been identified, a comparison can be made between a known "good" IC device and the DUT, at each state.

Such comparisons can be made with stroboscopic voltage contrast images. The device under test (DUT) is stimulated with a sequence of test "vectors" in a conventional E-Beam test system such as the Schlumberger "IDS 5000." Each test "vector" represents a specified set of stimuli, such as input voltages applied to the pins of the IC. During the application of each vector of the sequence, the DUT is in a state for a period of time called a "strobe window". By pulsing the electron beam repeatedly in a certain phase to the beginning of the sequence, a stroboscopic image representing the state of the DUT in any desired strobe window can be obtained. This strobe process is analogous to that of using a stroboscopic light to "freeze" the operation of an automobile engine to adjust ignition timing. A series of state images makes up a stack.

The process is repeated using a known good IC device (also called a golden die), so as to acquire a stack of stroboscopic images representing its states in response to the same series of test vectors. Each of the images may, for example, be a graphical representation in digital format in the form of a 512×512 matrix of pixels of varying intensity, the intensities being represented by a value between 0 and 255 (an 8-bit value). The images thus acquired, representing operating states of the DUT, can be stored and used to diagnose operating faults in the DUT.

After the images have been acquired, the stacks may be compared. The comparison may take the form of subtracting an image of the golden die from an image of the DUT (or vice versa), pixel by pixel, where the compared images are those produced in response to the same set of stimuli. The comparison is repeated, image by image, so as to produce a stack of "difference" images.

Alternatively, the two stacks may represent states of a single DUT in response to two different sets of stimuli. For example, a DUT may operate as designed at a given temperature or with a given input voltage, but fail at higher temperature or input voltage. One stack of images may be acquired representing correct operation of the DUT under one set of circumstances and a second stack acquired representing failed operation under a second set of circumstances. These stacks may also be compared, image by image, to produce a stack of "difference" images.

If the good and faulty devices behave the same way, the images are the same. Likewise, if a device subjected to different sets of stimuli is operating the same way in response to the different sets of stimuli, the images are the same. Any divergence between the two sets of images may be considered as a discrepancy in the test (or failing) device. T. May, G. Scott, E. Meieran, P. Wiener & V. Rao, Dynamic Fault Imaging of VLSI Random Logic Devices, INTERNATIONAL PHYSICS SYMPOSIUM PROCEEDINGS (1984). On a one-image-per-state basis, the comparison process reveals the propagation of the fault from its origin to the place where is first detected. The fault may appear as a discrepancy in the difference images; for example, a black or white line in an otherwise gray difference image may represent an incorrect logic level in the DUT. Such a comparison process is known as "Dynamic Fault Imaging" (DFI).

Of course, for the comparison to work properly, the two stacks of images must represent identical conditions: the same area of the chip, imaged at the same magnification under the same SEM operating conditions. However, it is possible that the images of one stack are tilted or rotated with respect to those of another stack due to slightly different orientation of the chips with respect to the SEM when the images are acquired. When perfect alignment is not possible, a spatial "warping" operation may need to be performed on each image of one stack to align it with the counterpart images of the other stack.

Once the images have been acquired, filtered, aligned and compared pixel-by-pixel to create a stack of resulting "difference" images, the difference images may be displaced to permit tracking of fault propagation through the series of images. The difference images may also be processed to enhance only the important information (the fault propagation) for analysis. However, for diagnostic purposes, information may be in overabundance with some 512×512 pixels per image and 8 bits per pixel. The information needed for diagnosis is really only that which tracks fault propagation through the series of images.

When the images have been properly processed and the subtraction well-performed, the real DFI diagnosis can begin. Clues to the nature, location and time of origin of the fault are to be found somewhere in the stack of difference images. To find these clues efficiently, it is important to be able to access, display and visually compare the images quickly and interactively (in tenths of seconds). One way to do this would be to simultaneously display all images of the stack in juxtaposition, making the fault propagation readily visible. However, if each image comprises 512×512 pixels, only four images at a time can be displayed on a conventional high-resolution computer workstation display screen.

One way to display large numbers of images simultaneously on the screen (for easy visual tracking of the fault propagation) is to reduce the size of each image to form an "icon", or compressed version of the image, to be displayed on the screen. If, for instance, a 512×512 pixel image is compressed into a 64×64 pixel icon, each pixel of the icon represents a square of 8×8 pixels of the initial image. Using such icons, tens of images may be displayed simultaneously on the display screen. However, when the image is compressed into an icon, information is lost (in the example given above, 63/64 of the information from the initial image may be lost). Because the details of the icons are needed for DFI analysis, a high-resolution compression of the images is required. However, as many icon images are to be displayed at once, efficient DFI analysis demands that image compression be performed rapidly once the images to be displayed have been selected from a stack. To achieve "interactive" operation, it is desirable to carry out any selected process, such as preparation of an icon from an image, and display the result within, for example, a period of not more than two seconds.

Systems are known in the art which employ convolutions to perform geometric operation, filtering and pattern recognition. Such systems sometimes use fast Fourier transform to speed up the computation of large convolutions. Floating-point arithmetic is often used since it is not known in advance how many operations will be performed on the data. But with the use of floating point arithmetic, intermediate results are often more precise than necessary and therefore excessively time-consuming to compute. When this precision is not required, it results in a waste of time and resources.

Another way to speed up image processing is to employ dedicated processors designed to perform specific tasks at high speed. The cost of such processor can, however, add significantly to the cost of a test system. It is preferred instead to use the general-purpose processor of a standard engineering workstation to perform image processing, but without loss of processing time.

A principal aim of the present invention is to provide methods and apparatus for high resolution image compression in a workstation of the type provided in a system such as the Schlumberger "IDS 5000" with sufficient speed to permit Dynamic Fault Imaging with an interactive "feel", but without the need for dedicated hardware to perform the processing.

More broadly, it is an object of the present invention to provide methods and apparatus for high-resolution compression of images into icons.

It is a further object of the present invention to perform such compression such that a plurality of such icons may be simultaneously displayed, as an aid in DFI analysis of integrated circuits.

Still another object of the present invention is to provide for rapid and interactive compression of voltage contrast images in a general-purpose workstation associated with an electron-beam test probe system, without the need for special-purpose computing hardware to perform the compression.

Yet another object of the present invention is to permit two-dimensional emulation on a workstation display screen of a three-dimensional representation of a stack of images known as a state cube.

SUMMARY OF THE INVENTION

The present invention provides methods for rapid compression of images composed of pixels into high-resolution, compressed icon images, and for dynamic fault imaging of operating faults in integrated circuits employing such methods. Displaying a plurality of such icons juxtaposed on a screen permits ready tracing of a fault in an IC device under test, even by persons having little knowledge of the functionality of the device.

In accordance with the invention, an image made up of $n \times n$ pixels may be compressed into an icon of $p \times p$ pixels, where $n = p \cdot q$ and q is an integer, by dividing the image into p tiles of q×q pixels, selecting q pixels from each tile, where each of said selected q pixels is representative of predetermined directional orientations within the tile, and calculating the mean value of the selected q pixels, to produce a single pixel representative of the tile. The pixels representative of said tiles thus form an icon of p×p pixels. Each of the selected q pixels is preferably uniquely representative of a horizontal row of q pixels, a vertical column of q pixels, and a pair of mutually-orthogonal diagonal lines of pixels of the tile. Edge enhancement may also be performed to sharpen the features of the resulting icon.

The invention further includes a method of dynamic imaging of operating faults in integrated circuit devices. A first stack of stroboscopic voltage contrast images is prepared, each of the images representing an operating state of an IC device and comprising a set of pixels. A second stack of stroboscopic voltage contrast images is prepared, each of the images representing an operating state of an IC device and comprising a set of pixels. A third stack of images of n×n pixels representing differences between images of the first stack and the second stack is then prepared by calculating a difference between pixel values of images of the first stack and images of the second stack. Multiple images of the third stack are compressed into icons of p×p pixels, where n=p·q and q is an integer, by dividing each image into p tiles of q×q pixels, selecting q pixels from each tile, where each of said selected q pixels is representative of predetermined directional orientations within the tile, and calculating the mean value of the selected q pixels to produce a pixel representative of the tile, such that the pixels representative of the tiles form an icon of p×p pixels. A plurality of such icons are simultaneously displayed, so that differences in operating states between the first stack and the second stack may be readily viewed.

Image compression is preferably carried out with a suitably programmed general purpose processor associated with an electron beam test probe system.

The methods and apparatus of the present invention thus enable rapid and efficient analysis of dynamic processes, such as operating faults in integrated circuit devices.

DESCRIPTION OF THE PREFERRED EMBODIMENTS

Figure 1:
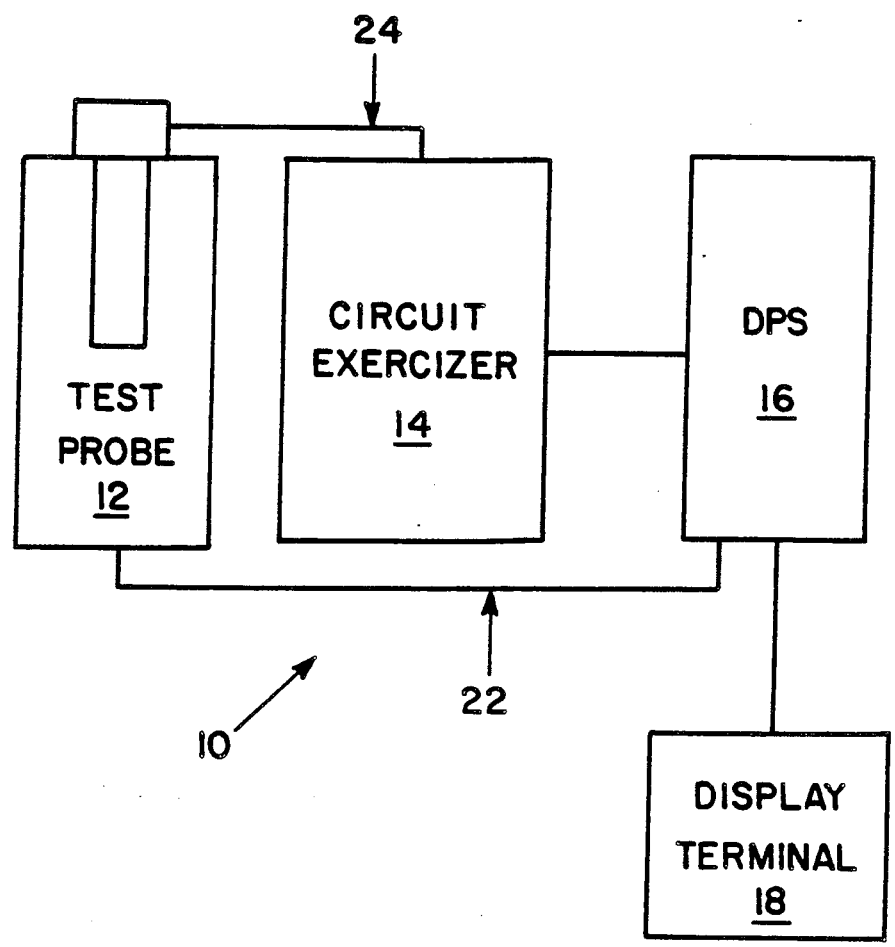
FIG. 1 is a schematic block diagram of an electron beam test system.

A schematic block diagram of an electron beam test probe system useful for analyzing integrated circuits is shown at 10 in FIG. 1. The electron beam test probe system has three functional elements: an electron beam test probe 12, a circuit exerciser 14, and a data processing system 16 which includes a display terminal 18. An integrated circuit to be analyzed is placed in the electron beam test probe 12 so that potential measurements can be made at various points of the IC. The points at which said measurements are to be made are sent to the electron beam test probe 12 by the data processing system 16 over a bus 22. During the circuit analysis, a test signal pattern is applied to the integrated circuit by the circuit exerciser 14 which is connected to the IC under test by a bus 24. The data processing system 16 may also be used to specify the test signal pattern used and the timing of the potential measurements relative to the test signal pattern. The electron beam test probe system is controlled by an operator who inputs commands through the display terminal 18.

Figure 2:
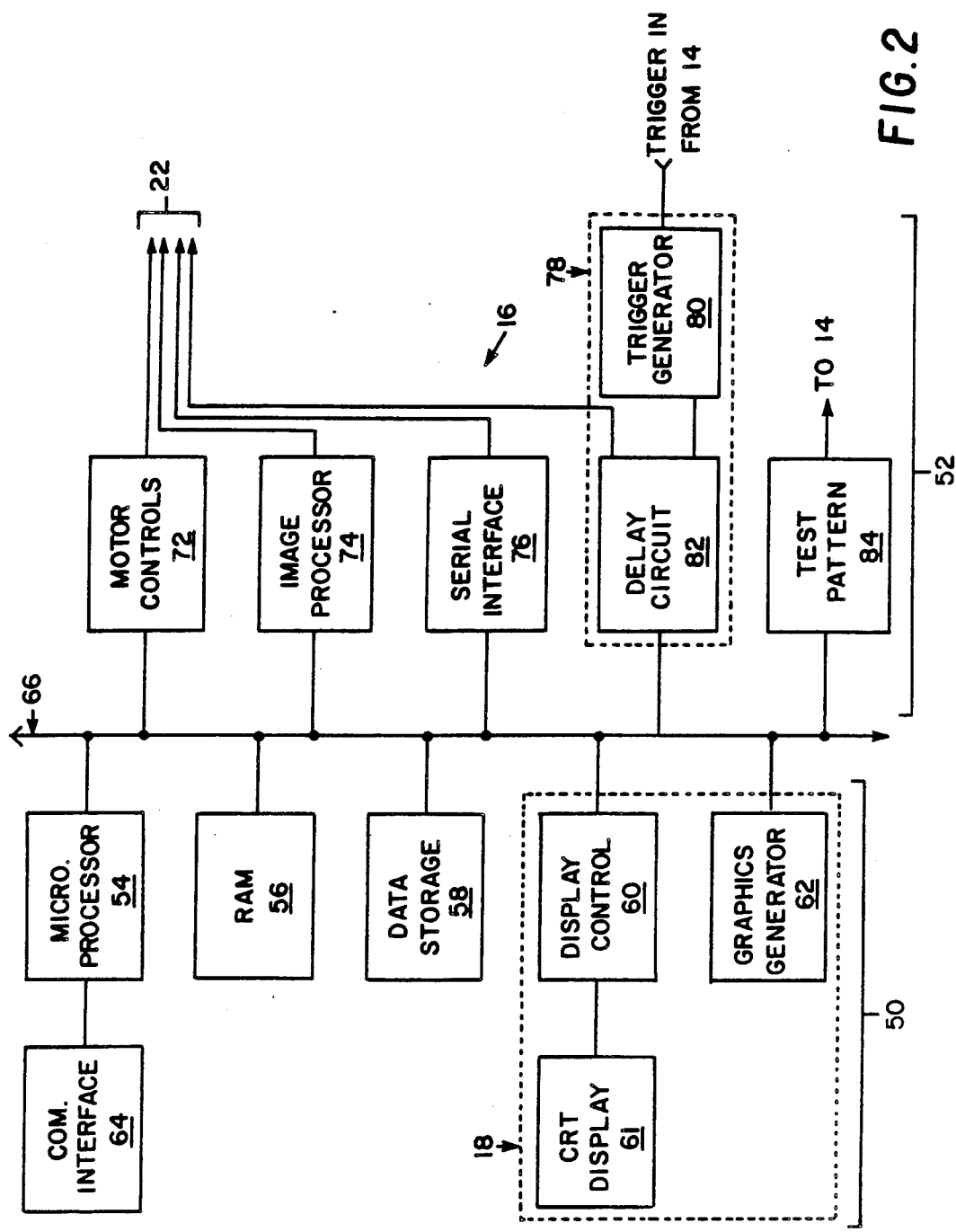
FIG. 2 is a schematic block diagram of the data processing system used in the electron beam test system illustrated in FIG. 1.

A block diagram of data processing system 16 is shown in FIG. 2. The data processing system 16 may be divided into two broad functional groups: a computing system 50 and an electron beam test probe control system 52. Only the computing system 50 will be described here. The balance of the system is described in U.S. Pat. No. 4,706,019, the disclosure of which is incorporated herein by reference. The computing system 50 is capable of storing, processing and displaying high resolution voltage contrast images of the IC under test. Computer system 50 includes a microprocessor 54, a RAM memory 56, and a data storage module 58 which may comprise a disk drive. In addition, computer system 50 includes a display terminal 18 having a display interface 60 for driving a high resolution color display terminal 61 having a resolution of, for example, at least 1000×1000 pixels. The display terminal 18 also includes a keyboard for entering commands and a pointer means (such as a "mouse") for pointing to and specifying points on the display screen. Display terminal 18 may also include its own graphics accelerator 62 to reduce the time needed to produce a graphic display. Computing system 50 may further include interfaces 64 for communicating with other computer systems via a communication bus 66.

Figure 3:
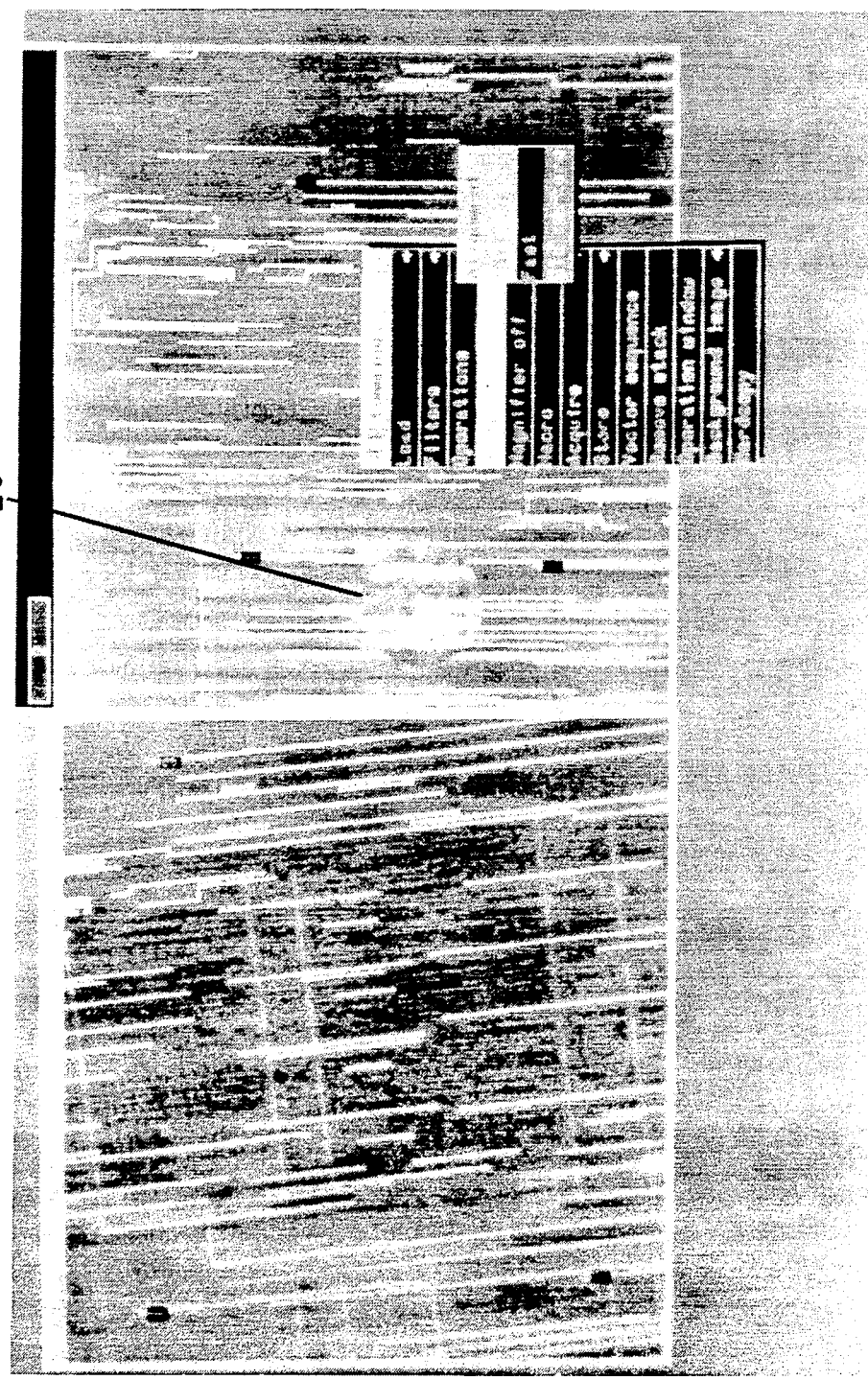
FIG. 3 is a photograph showing a screen display of a pair of stroboscopic voltage contrast images.

FIG. 3 is a photograph showing a screen display of a pair of stroboscopic voltage contrast images selected from two stacks of images acquired with a Schlumberger "IDS 5000" electron beam test probe system. Each image is made up of an array of 512×512 pixels, each pixel having a digital gray-scale intensity value between 0 and 255. Each stack may consist of up to 100 or even more of such images. It is desired to simultaneously display many of such images for DFI analysis, yet the images are sufficiently large that only four at a time may be displayed on the display screen of a typical engineering workstation.

Figure 4:
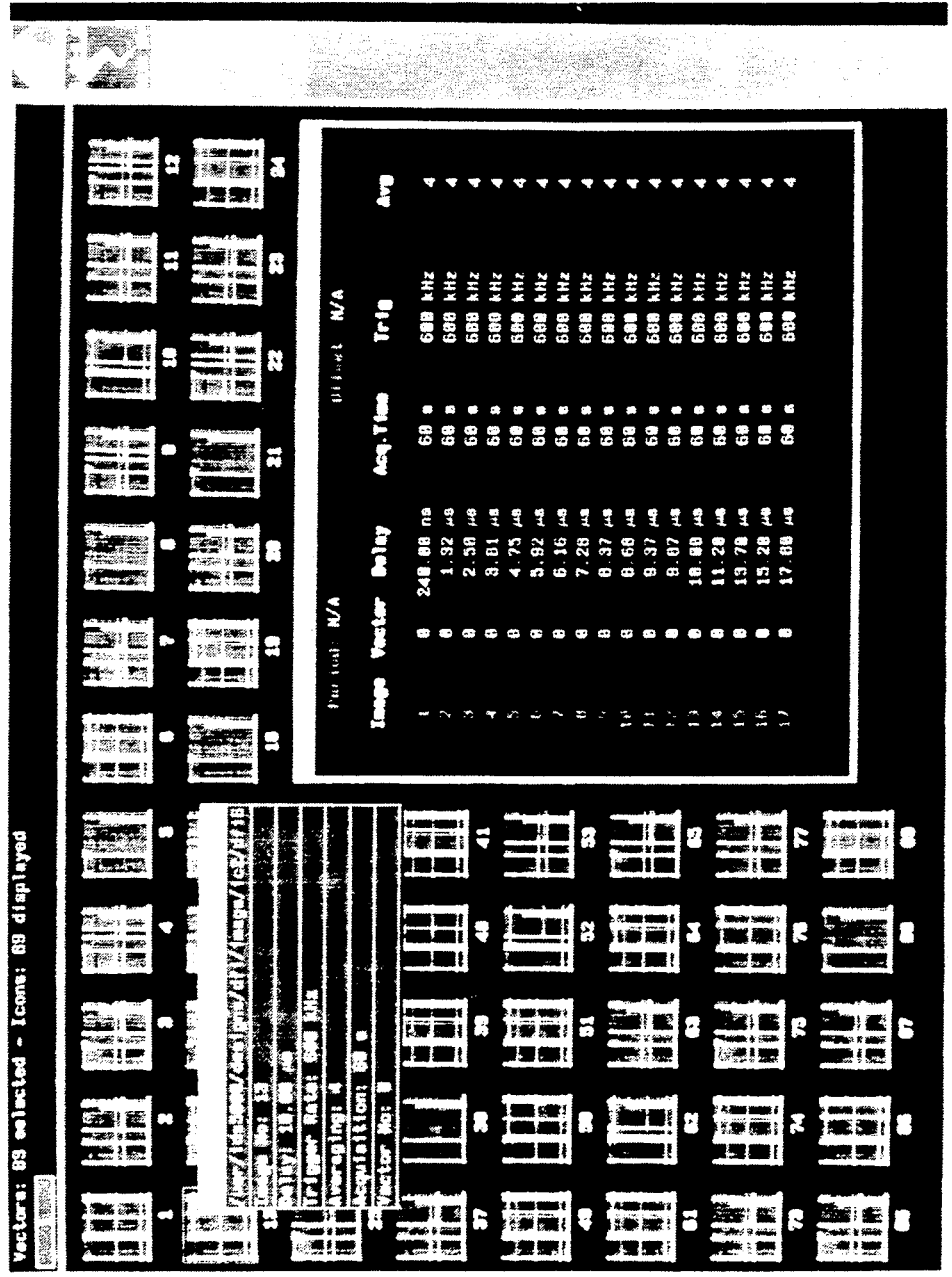
FIG. 4 is a photograph showing a screen display of a series of icons prepared from a stack of stroboscopic voltage contrast images in accordance with the present invention.

FIG. 4 is a photograph showing a screen display of a series of icons prepared from a stack of stroboscopic voltage contrast images in accordance with the present invention. Operation of the device under test can be readily traced from state to state due to the retention of important features of the images in the icons.

Figure 5:
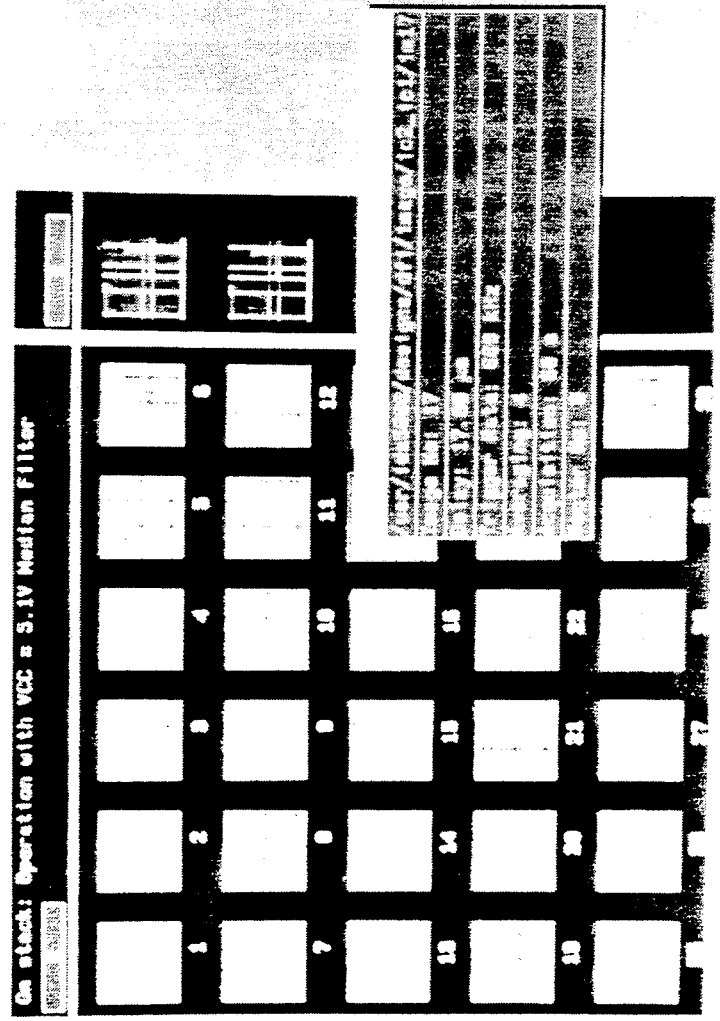
FIG. 5 is a photograph showing a screen display of a series of icons prepared from a stack of difference images in accordance with the present invention.

FIG. 5 is a photograph showing a screen display of a series of icons prepared from a stack of difference images in accordance with the present invention. An icon of one image from each of two stacks from which the difference image icons were prepared are shown in the upper right portion of FIG. 5. The difference image icons (numbered 1 through 30) in the left portion of FIG. 5 show the propagation of faults in the device under test. Icons which are entirely white show that no fault is occurring at their operating states. Black lines in the other difference icons reveal a fault which propagates through the displayed portion of the device under test. The pattern of propagation indicates that the fault repeats itself in a regular manner, from which it may be deduced that incorrect logic levels are periodically corrected, possibly by a reset signal.

It is an object of the present invention to permit emulation of what has become known as the state cube. The state cube is a 3-dimensional representation of a stack of images. The 2-dimensional images are given a temporal third dimension by taking into account the delays of the different strobe windows.

To achieve this object, the invention offers methods of compressing the images into icons which retain sufficient resolution to permit operation of the device to be traced, but which are small enough for simultaneous, juxtaposed display of a series of images. FIG. 5 shows a screen display of a series of icons prepared and displayed in accordance with the methods of the invention. With such icons, up to 100 images (25 MB of information) can be rapidly prepared and displayed. For example, compression and storage of each image has been found to require only about 0.1 second when performed on a suitably programmed Sun Microsystems 3/160 workstation processor.

The state cube is emulated with an icon display. The icon is actually a $\frac{1}{8}$ scale version of a real image. The icons are produced by a method which allows sub-pixel resolution and therefore kept most of the information of the full scale image. This high resolution display may be examined to discover the origin of the fault by studying the evolution of the icons from one strobe window to the next.

Figure 6:
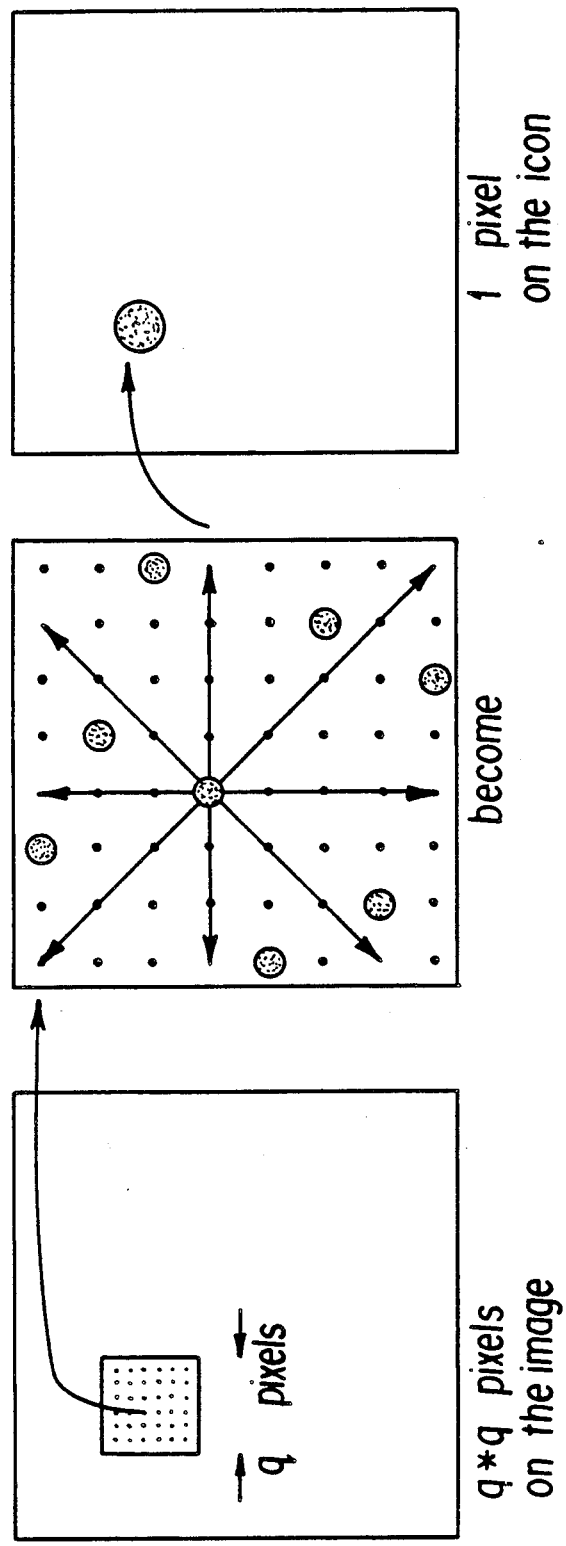
FIG. 6 illustrates schematically the compression of an image to form an icon in accordance with the present invention.

With reference to FIG. 6, it is assumed that an image of $n \times n$ pixels is to be compressed into an icon of $p \times p$ pixels, where $$n = p \cdot q$$

where n, p, q$\in$N (i.e., n, p & q are integers) and each pixel has a given value (for example, a gray scale value between 0 and 256).

The $n \times n$ image can be divided into a grid of tiles, each tile having $q \times q$ pixels. Each of these tiles will contribute to one pixel in the icon.

Within a tile, all the pixels seem to have equal information value. Therefore, the simplest solution would be to take the mean value of all the pixels of the tile to create a single pixel of the icon.

This approach would have a major drawback: because there are many pixels to process ($q^2$ in each tile), significant time is needed to make the necessary calculations.

The present invention provides methods for high-resolution compression of images, while substantially reducing the computing time in a general purpose digital computer. The run-time is divided by q. Thus, to produce a $64 \times 64$ pixel icon from a $512 \times 512$ pixel image using the technique described above would take approximately 8 times as along as the methods of the present invention.

The methods of the present invention exploit the usually high directional correlation of the pixels in an image.

To use a mechanical analogy, an image may be considered to have high-correlation axes much as a solid body has axes of inertia. These can be axes of symmetry, such as in an image having features with generally vertical and/or horizontal orientation. Thus, an image may have 0, 1 or 2 principal directions of feature orientation, which will be referred to hereafter as gray axes, much as a 2-Dimensional solid has 0, 1 or 2 inertial axes. Since the pixel values along these axes are highly correlated, not all of them need be used in computation of the pixel values which will make up the icon.

If q is not too large (for example, if n=512, p=64 and q=8), the gray axes are approximately 0°, ±45° or 90°. The closer the gray axes of the image are to these directions, the more accurately the icon represents the image from which it is prepared.

The solution is then to take the mean of the gray-scale values of a set of q pixels, each of these q pixels being alone in its line, alone in its column and alone its diagonals (the lines that pass by this pixel and that oriented by ±45°), as shown in FIG. 6. As long as q is greater than 3, it is possible to select such a set of pixels. Using a lookup table of values to obtain a normalized result for the mean value of the q pixels, an icon can be prepared rapidly from an image using a suitably programmed general purpose workstation processor.

Figure 7:
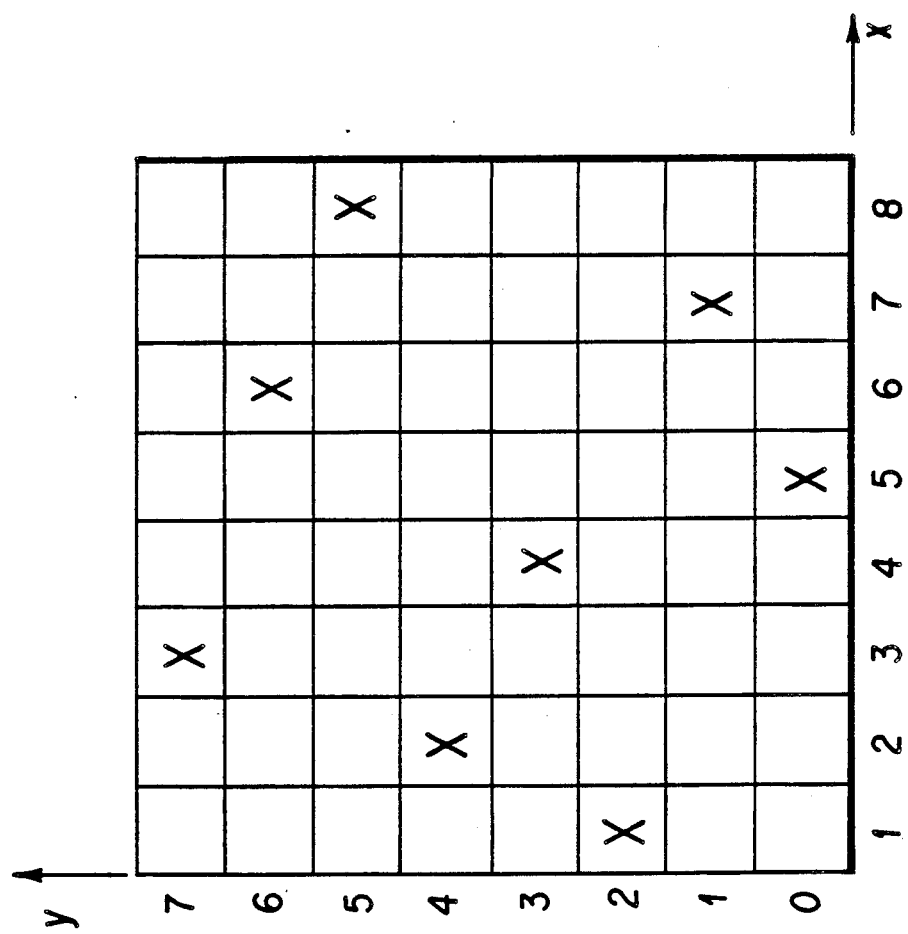
FIG. 7 shows one possible solution to the "8-queen" problem which may be employed in compression of images in accordance with the present invention.

Another analogy which illustrates the technique employed by the method of the present invention is that of the "8 queen" chess problem: 8 chess queens are to be placed on a chess board in respective positions such that no queen may take any other queen, as illustrated in FIG. 7. (It will be recalled that the "queen" playing piece in chess is permitted to move an unlimited number of squares on the chess board in the horizontal, vertical or diagonal direction.) When the 8 queens are properly placed, none is in the field of movement of any other.

Each tile of the image may be mapped as a virtual chess board, each pixel representing a black or a white square of a chess board. The positions of the image pixels to be taken into account for the compression are the positions of the "queens" in the 8-queen problem. In this manner, the correlation of the pixels is exploited.

A preferred method of performing the present invention may be carried out in a series of steps, as follows:

(1) Select a $512 \times 512$ pixel image, the intensity level value of each pixel represented by an 8 bit value (i.e., an integer between 0 and 255). If the image is stored as a file in data storage device 58, its values are read into a register array for processing. If the image is stored in one of the display frame buffers of image processor 74, its values are mapped into the register array.

(2) Divide the image in $64 \times 64$ tiles of $8 \times 8$ pixels each.

(3) Transform each tile into an icon pixel having an intensity level value p by performing an 8-queen type of mean of the pixel values t(x,y) within the tile. For example:

$$8 \cdot p = t(1,2) + t(2,4) + t(4,3) + t(5,0) + t(6,6) + t(7,1) + t(8,5)$$

In the 8×8 array t, only one value per line and per column is taken. The following set of values represent one of many possible sets of pixels satisfying the 8-queen requirement. Any of such possible sets may be used.

value at line 1 column 2
value at line 2 column 4
value at line 3 column 7
value at line 4 column 3
value at line 5 column 0
value at line 6 column 6
value at line 7 column 1
value at line 8 column 5

These values are added, and the result is divided by 8 (normalized) to obtain the intensity value p of the pixel representing the tile.

The resulting 64×64 array p(x,y) of pixel data defines the icon.

(4) The quality of the icon is then preferably sharpened by convolution with a standard edge enhancement operator, since a feature of interest, such as the width of a metal line of the device under test, may be represented by as few as two pixels. To do this, each value of the array (representing the intensity level of pixel of the icon) is averaged with the values of the surrounding pixels using a weighted means. For example, the value of each pixel to be enhanced is assigned a positive weight of 8, and the value of each of the four surrounding pixels is assigned a negative weight $-1$; the weighted values are summed, and the result is divided by 4 to normalize the resultant pixel value. This process provides for efficient enhancement of edges defining features of the icon. Such enhancement operators are well-known in the art: see, for example, W. PRATT, DIGITAL IMAGE PROCESSING (1978), the disclosure of which is incorporated herein by reference, at page 322.

It has been found that a 64×64 pixel icon may be created from a 512×512 image in less than 0.1 second using a Sun 3/160 workstation operated in accordance with the program appended to this specification. It has also been found that when the icons are stored in data storage means 58 along with the images, a series of 100 icons may be retrieved and displayed in approximately two seconds, facilitating rapid interactive DFI analysis.

APPENDIX

Copyright © 1988 Schlumberger Technologies Inc.

```
/*************************************************************************
*********************/

/*
* 2 Look-up Tables (LUT) in 1 : the 6 * 64 first values are used to clip
* values out of range
* the 256 next fit the pixel values with the colormap
*/ makecvt_cm(cvt,input_type)
unsigned short *cvt;
char input_type;
{
register unsigned short i;
register unsigned short *cv;

cv = cvt;
for (i = 0; i <(8 * 64 - 4 * 32); i++)
    cv[i] = (i < 4 * 33 ? 4 * 33 : (i > 4 * 63 ? 4 * 63 : i));
```

```
cv = &cvt[8 * 64 - 4 * 32];
if (input_type == 'f'){            /* when the input is 8 bit deep */
    for (i = 0; i < 240; i++) cv[i] = 33 + (i >> 3);
    for (i = 240; i< 256; i++)cv[i] = 63;
}else{                             /* when the input is a 5 bits deep*/
    for (i = 0 ; i < 33; i++) cv[i] = 33;
    for (i = 33; i < 63; i++) cv[i] = i;
    for (i = 63; i < 256; i++) cv[i] = 63;
}
}
```

```
/**********************************************************************
 * transform a rast into an icon; use the 8 queen algorithm: on a 8 * 8 array
 * take 1 value per line and per column and average it using the LUT cvt
 **********************************************************************/ slow_icon(icon, irast, cvt, size)
unsigned char   *irast, *icon;
unsigned short  *cvt;
int size;
{
register unsigned char *src;
register unsigned short *cv;
register unsigned char *b;
register short  i, j;
register int    tmp, tmp1;

cv = &cvt[8 * 64 - 4 * 32];
    /* transform the 512 * 512 (or 512 * 256) into 64 * 64 */
    b = icon;
    src = irast;

if (size == 512 * 512) {
```

```
        i = 64;
        for (; --i != -1;) {
            j = 32;
            for (; --j != -1;) {
                tmp = src[2];
                tmp += src[512 + 4];
                tmp += src[512 * 2 + 7];
                tmp += src[512 * 3 + 3];
                tmp += src[512 * 4 + 0];
                tmp += src[512 * 5 + 6];
                tmp += src[512 * 6 + 1];
                tmp += src[512 * 7 + 5];
                tmp += 4;
                tmp >>= 3;
                *b++ = (unsigned char) cv[tmp];

tmp = src[2 + 8];
                tmp += src[512 + 4 + 8];
                tmp += src[512 * 2 + 7 + 8];
                tmp += src[512 * 3 + 3 + 8];
                tmp += src[512 * 4 + 0 + 8];
                tmp += src[512 * 5 + 6 + 8];
                tmp += src[512 * 6 + 1 + 8];
                tmp += src[512 * 7 + 5 + 8];
                tmp += 4;
                tmp >>= 3;
                *b++ = (unsigned char) cv[tmp];
                src += 16;
            }
            src += 7 * 512;
        }
    } if (size == 512 * 256) {
        i = 64;
```

```
for (; --i != -1;) {
    j = 32;
    for (; --j != -1;) {
        tmp1 = src[1];
            tmp1 &= 0xf;
            tmp1 <<= 4;
            tmp = tmp1;

tmp1 = src[256 + 2];
            tmp1 &= 0xf;
            tmp1 <<= 4;
            tmp += tmp1;

tmp += src[256 * 2 + 3];
            tmp1 &= 0xf0;
            tmp += tmp1;

tmp += src[256 * 3 + 1];
            tmp1 &= 0xf0;
            tmp += tmp1;

tmp += src[256 * 4 + 0];
            tmp1 &= 0xf;
            tmp1 <<= 4;
            tmp = tmp1;

tmp += src[256 * 5 + 3];
            tmp1 &= 0xf;
            tmp1 <<= 4;
            tmp = tmp1;

tmp += src[256 * 6 + 0];
            tmp1 &= 0xf0;
            tmp += tmp1;
```

```
        tmp += src[256 * 7 + 2];
                tmp1 &= 0xf0;
                tmp = tmp1;

tmp += 4;
tmp >>= 3;
*b++ = (unsigned char) cv[tmp];

tmp1 = src[1 + 4];
                tmp1 &= 0xf;
                tmp1 <<= 4;
                tmp = tmp1;

tmp1 = src[256 + 2 + 4];
                tmp1 &= 0xf;
                tmp1 <<= 4;
                tmp += tmp1;

tmp += src[256 * 2 + 3 + 4];
                tmp1 &= 0xf0;
                tmp += tmp1;

tmp += src[256 * 3 + 1 + 4];
                tmp1 &= 0xf0;
                tmp += tmp1;

tmp += src[256 * 4 + 0 + 4];
                tmp1 &= 0xf;
                tmp1 <<= 4;
                tmp = tmp1;

tmp += src[256 * 5 + 3 + 4];
                tmp1 &= 0xf;
                tmp1 <<= 4;
```

```
                tmp = tmp1;

tmp += src[256 * 6 + 0 + 4];
                tmp1 &= 0xf0;
                tmp += tmp1;

tmp += src[256 * 7 + 2 + 4];
                tmp1 &= 0xf0;
                tmp = tmp1;

tmp += 4;
        tmp >>= 3;
        *b++ = (unsigned char) cv[tmp];
        src += 16;
    }
    src += 7 * 512;
   }
  }
}

/****************************************************
 * filter used to enhance the edges of the icon
 ****************************************************/
icon_sharpener(icon, sicon, cvt)
unsigned char  *icon, *sicon;
unsigned short *cvt;
{
register unsigned char *src;
register unsigned char *ic;
register unsigned short *cv = cvt;
register short  i, j;
register int    tmpa, tmpb;

/* sharpen up the icon irast */
    src = sicon;
```

```
            j = 64;
            for (; --j != -1;){
                *src++ = DFI_BLACK;
                *src++ = DFI_BLACK;
            }
            ic = &icon[128];
            for (i = 1; i < 62; i++) {
                j = 60;
                *src++ = DFI_BLACK;
                *src++ = DFI_BLACK;
                ic++;
                ic++;
                for (; --j != -1;) {
                    tmpb = ic[-64];
                    tmpb += ic[-1];
                    tmpb += ic[1];
                    tmpb += ic[64];
/* multiply by 8 */
                    tmpa = ic[0];
                    tmpa <<= 3;
                    tmpa -= tmpb;
/* LUT for normalization */
                    tmpa = cv[tmpa];
                    tmpa >>= 2;
                    *src++ = (unsigned char) tmpa;
                    ic++;
                }
                *src++ = DFI_BLACK;
                *src++ = DFI_BLACK;
                ic++;
                ic++;
            }
            j = 64;
            for (; --j != -1;){
                *src++ = DFI_BLACK;
```

```
        *src++ = DFI_BLACK;
    }
}

/*
 * path  : pathname of the file whose icon has to be made; can be '\0'
 * choice: 'n' for nice or 'f' for fast oicon : the output icon created by
 * the procedure
 *
 * returns :  0 if OK -3 if sthg cannot be read or open -4 if there is a write p
b
 *
 * irast : input raster
 */ int dfi_makeicon(path, irast, choice, oicon, size)
char            *path;
unsigned char   *irast;
char            choice;
unsigned char   *oicon;
int size;
{
unsigned char   *icon = icr;
static unsigned short cvt[8 * 64 - 4 * 32 + 256];
unsigned char   *rast;
char            input_type;
static char     flag = '\0';
int             rdwr = 1;
int             fd;
int             load_size = 512 * 512;

if (!irast) rast = r1;
    else rast = irast;
    if ((!rast) || (!icon)) {
        return parser_error_mess(ALLOC_ERR, NO_TEXT);
```

```
        } input_type = 'r';

/*************************/
/* if it is a file read it */
/*************************/ if (path) {       /* file to raster */
        if (size != 512 * 512) load_size = 256 * 512;
        fd = open(path, O_RDWR);
        if (fd < 0) {
            fd = open(path, O_RDONLY);
            if (fd < 0) {
                return parser_error_mess(NO_FILE, path);
            }
            rdwr = 0;
        }

/***********************************************************/
/* if it is a frame buffer mmap it into the array "rast" */
/***********************************************************/ if (mmap(rast, (long) (512 * 512), PROT_READ, MAP_SHARED, fd, 0))
            if (read(fd, (char *) rast, load_size) != load_size) return parser_error_mess(NO_FILE, path);
        input_type = 'f';   /* file. */
    } else if (!irast) {
        return parser_error_mess(SYN_ERR, NO_TEXT);
    }

/*************************/
/* make the Look up table */
/*************************/
```

```c
    if (flag != input_type) {
        makecvt_cm(cvt, input_type);
        flag = input_type;
    } if (path) {
        sprintf(msg, "%s", path);
        message(msg);
    }

/***************************************/
/* average with the 8 queen algorithm */
/***************************************/ slow_icon(icon, rast, cvt, load_size);

/*******************************/
/* edge.enhancement operation */
/*******************************/ icon_sharpener(icon, oicon, cvt);

if (path) {
        if (rdwr) {
            lseek(fd, (long)(64 * 64), L_XTND);
            lseek(fd, (long)(512 * 512), L_SET);
            if (write(fd, (char *)oicon, 64 * 64) == -3) {
                return parser_error_mess(IO_PB, path);
            }
        }
        close(fd);
    }
    return 0;
}
```

We claim:

1. A method of compressing an image of n×n pixels stored in a storage device into an icon of p×p pixels capable of being displayed on a display device, where n=p·q and q is an integer, comprising the steps of:
   a. dividing said image into p tiles of q×q pixels;
   b. selecting q pixels from each said tile, where each of said selected q pixels is representative of a predetermined row and column within said tile and each pixel selected occupies a different row and column; and
   c. calculating the mean value of said q pixels from each said tile, to produce a pixel representative of said tile, wherein said pixels representative of said tiles form an icon of p×p pixels capable of being displayed on a display device.

2. The method of claim 1, wherein each of said selected q pixels is uniquely representative of a horizontal row of q pixels and a vertical column of q pixels of said tile.

3. The method of claim 1, wherein each of said selected q pixels is uniquely representative of mutually-orthogonal diagonal lines of pixels of said tile.

4. The method of claim 2, wherein each of said selected q pixels is uniquely representative of mutually-orthogonal diagonal lines of pixels of said tile.

5. The method of claims 1, 2, 3 or 4, further comprising the step of enhancing said icon by convolving said pixels representative of said tiles with an edge enhancement operator.

6. A method of dynamic imaging of operating faults in integrated circuit devices, comprising the steps of:
   a. preparing a first stack of stroboscopic voltage contrast images, each said image representing an operating state of one said device and comprising a set of pixels;
   b. preparing a second stack of stroboscopic voltage contrast images, each said image representing an operating state of one said device and comprising a set of pixels;
   c. preparing a third stack of images of n×n pixels representing differences between images of said first stack and said second stack by calculating a difference between pixel values of images of said first stack and images of said second stack;
   d. compressing multiple images of said third stack into icons of p×p pixels, where n=p·q and q is an integer, by
      i. dividing each said image into p tiles of q×q pixels;
      ii. selecting q pixels from each said tile, where each of said selected q pixels is representative of a predetermined row and column within said tile and each pixel selected occupies a different row and column; and
      iii. calculating the mean value of said q pixels from each said tile, to produce a pixel representative of said tile, wherein said pixels representative of said tiles form an icon of p×p pixels; and e. simultaneously displaying a plurality of said icons, whereby differences in operating states between said first stack and said second stack may be readily viewed.

7. Apparatus for compressing an image of n×n pixels stored in a storage device into an icon of p×p pixels capable of being displayed on a display device, where n=p·q and q is an integer, comprising:
   a. means for dividing said image into p tiles of q×q pixels;
   b. means for selecting q pixels from each said tile, where each of said selected q pixels is representative of a predetermined row and column within said tile and each pixel selected occupies a different row and column; and
   c. means for calculating the mean value of said q pixels from each said tile, to produce a pixel representative of said tile, wherein said pixels representative of said tiles form an icon of p×p pixels capable of being displayed on a display device.

8. A method of dynamic imaging of operating faults in integrated circuit devices, comprising the steps of:
   a. preparing a first stack of stroboscopic voltage contrast images, each said image representing an operating state of an integrated circuit device and comprising a set of pixels;
   b. preparing a second stack of stroboscopic voltage contrast images, each said image representing an operating state of an integrated circuit device and comprising a set of pixels;
   c. preparing a third stack of images n×n pixels representing differences between images of said first stack and said second stack by calculating a difference between pixel values of images of said first stack and images of said second stack, said pixels of images of said third stack defining features having primarily horizontal and vertical orientations;
   d. compressing multiple images of said third stack into icons of p×p pixels, where n=p·q and q is an integer, by
      i. dividing each said image into p tiles of q×q pixels;
      ii. selecting q pixels from each said tile, where each of said selected pixels is uniquely representative of said horizontal and vertical orientations at a location within said tile; and
      iii. calculating the mean value of said selected pixels from each said tile, to produce a pixel representative of said tile, wherein said pixels representative of said tiles form an icon of p×p pixels; and
   e. simultaneously displaying a plurality of said icons, whereby differences in operating states between said first stack and said second stack are readily viewed.

9. The method of claim 8, wherein said images further includes features having primarily diagonal orientations, and wherein each of said selected pixels is uniquely representative of said diagonal orientations at a location within said tile.

10. The method of claims 8 or 9, further comprising the step of enhancing said icon by convolving said pixels representative of said tiles with an edge enhancement operator.

11. Apparatus for dynamic imaging of operating faults in integrated circuit devices, comprising:
   a. means for preparing images, comprising
      i. means for preparing a first stack of stroboscopic voltage contrast images, each said image representing an operating state of an integrated circuit device and comprising a set of pixels, ii. means for preparing a second stack of stroboscopic voltage contrast images, each said image representing an operating state of an integrated circuit device and comprising a set of pixels, and iii. means for preparing a third stack of images of n×n pixels representing differences between images of said first stack and said second stack by calculating a difference between pixel values of images of said first stack and images of said second stack, said pixels of images of said third stack defining features having primarily horizontal and vertical orientations;

b. means for compressing multiple images of said third stack into icons of p×p pixels, where n=p·q and q is an integer, comprising i. means for dividing each said image into p tiles of q×q pixels;

ii. means for selecting q pixels from each said tile, where each of said selected pixels is uniquely representative of said horizontal and vertical orientations at a location within said tile; and iii. means for calculating the mean value of said pixels selected from each said tile, to produce a pixel representative of said tile, wherein said pixels representative of said tiles form an icon of p×p pixels; and c. means for simultaneously displaying a plurality of icons, whereby differences in operating states between said first stack and said second stack are readily viewed.

* * * * *